US007581421B2

(12) United States Patent
Don et al.

(10) Patent No.: US 7,581,421 B2

(45) Date of Patent: Sep. 1, 2009

(54) DOOR LOCK ASSEMBLY HAVING A SUPPORT STRUCTURE TO SUPPORT A TAILPIECE AND A RETAINING PLATE

(75) Inventors: Lan-Kun Don, Chayi (TW); Po-Yang Chen, Chiayi (TW); Ching-Chuan Kuo, Chiayi County (TW)

(73) Assignee: Tong Lung Metal Industry Co., Ltd, Chia-Yi (TW)

( * ) Notice: Subject to any disclaimer, the term of this patent is extended or adjusted under 35 U.S.C. 154(b) by 32 days.

(21) Appl. No.: 11/858,274

(22) Filed: Sep. 20, 2007

(65) Prior Publication Data

US 2008/0072634 A1 Mar. 27, 2008

(30) Foreign Application Priority Data

Sep. 22, 2006 (TW) .............................. 95217085 U

(51) Int. Cl.
*B60R 25/02* (2006.01)

(52) U.S. Cl. .......................... 70/224; 292/349; 292/355

(58) Field of Classification Search ................... 70/224; 292/347-349, 355, 356, 359
See application file for complete search history.

(56) References Cited

U.S. PATENT DOCUMENTS 666,800 A * 1/1901 Chase ........................ 292/359
736,290 A * 8/1903 Noack ........................ 292/349
1,820,504 A * 8/1931 Simon ......................... 70/223
1,831,043 A * 11/1931 Stone ......................... 292/355
1,874,139 A * 8/1932 Stone ......................... 292/355
1,988,130 A * 1/1935 Martinek .................... 292/352
2,062,765 A * 12/1936 Schlage ....................... 70/224
2,301,751 A * 11/1942 Schlage ....................... 70/224
2,827,323 A * 3/1958 Kessel et al. ................ 292/352
2,961,268 A * 11/1960 Russell et al. ............... 292/352
2,976,073 A * 3/1961 Russell et al. ............... 292/352
3,212,306 A * 10/1965 Russell et al. ................. 70/224
4,394,821 A * 7/1983 Best et al. ...................... 70/422
4,428,570 A * 1/1984 Foshee et al. ............... 267/164
4,655,059 A * 4/1987 Best et al. ...................... 70/224
5,077,994 A * 1/1992 Trull et al. ..................... 70/224
5,704,234 A * 1/1998 Resch ......................... 70/371
5,782,119 A * 7/1998 Ellis et al. ...................... 70/371
6,029,484 A * 2/2000 Jetton .......................... 70/371
6,948,748 B2 * 9/2005 Romero ...................... 292/353
7,156,432 B2 * 1/2007 Sledge et al. ............... 292/358

* cited by examiner

*Primary Examiner*—Suzanne D Barrett
(74) *Attorney, Agent, or Firm*—Chun-Ming Shih

(57) ABSTRACT

A door lock assembly includes a transverse retaining plate disposed inside a spindle tube and having a stabilizing part and a retaining tongue projecting into a retention slot in a handle. A support structure is disposed within the handle oppositely of the retention slot and has a support part extending radially into the spindle tube. When the door lock assembly is in a locking state and when the retaining tongue in the retention slot is pressed externally, one of two diametrically opposite edges of a tailpiece of a key plug abuts against the support part, and the other one of the edges abuts against the stabilizing part of the retaining plate to restrict the retaining tongue from moving away from the retention slot, thereby preventing undesirable removal of the handle from the door lock assembly.

4 Claims, 8 Drawing Sheets

DOOR LOCK ASSEMBLY HAVING A SUPPORT STRUCTURE TO SUPPORT A TAILPIECE AND A RETAINING PLATE

CROSS-REFERENCE TO RELATED APPLICATION

This application claims priority of Taiwanese Utility Model Patent Application No. 095217085, filed on Sep. 22, 2006.

BACKGROUND OF THE INVENTION

1. Field of the Invention

This invention relates to a door lock assembly, more particularly to a door lock assembly having a retaining plate to removably hold a handle on a spindle tube.

2. Description of the Related Art

It is known to provide a door lock with a handle that carries a key-operated lock and that is connected to a spindle tube through which a latching device can be operated to latch or unlatch a door. Typically, the handle is connected removably to the spindle tube through a retaining plate that is disposed within the spindle tube and that is biased by a spring to interlock with a retention slot provided in the handle. The handle has a tubular body connected to the spindle tube and a longitudinal slot receiving a key-operated cylinder lock having a key plug connected to a tailpiece to operate the latching device. The retaining plate is disposed transversely in the longitudinal slot and is biased to project into the retention slot in the tubular body of the handle, thereby holding the handle on the spindle tube. When it is necessary to detach the handle from the spindle tube, the cylinder lock is first placed in an unlocking position, and a tool such as a pin is inserted into a tool hole formed in the tubular body of the handle to press the retaining plate so that the retaining plate is moved away from the retention slot and the handle can be removed from the spindle tube to replace the key-operated lock for re-keying.

Therefore, in order to prevent removal of the handle from the spindle tube against burglary, it is important that the retaining plate must be retained in the retention slot. In the conventional door lock, while the retaining plate can be kept in the retention slot through abutment with the tailpiece of the key-operated lock which is rotated to a locking position, due to the clearances that are likely to occur at the connection between the key plug and the tailpiece, the tailpiece can be swung to and fro by an external force and thus will be insufficient to rigidly support the retaining plate. Therefore, there is a likelihood incidence that the retaining plate may be removed undesirably from the retention slot by an external force when the key-operated lock is in the locking position.

U.S. Pat. No. 5,077,994 discloses a door lock having a lever handle that is removable from a rotary spindle for re-keying. The door lock includes a retaining plate 40 disposed transversely in a tubular body of a lever handle and is biased by a resilient block 70 that is disposed in a slot of the tubular body. The retaining plate has an aperture 48 and a downward lobe 50 projecting into the aperture. A lock tailpiece is connected to a plug 64 which is formed with a longitudinal groove 66 and which extends through the aperture. To rekey the door lock, the plug is rotated by a key to an angle (see FIG. 3) so that the groove on the plug receives the lobe on the retaining plate when the retaining plate is pressed by a tool inserted into a retention slot in the tubular body. In FIG. 2 of the patent, the lock tailpiece is in a locking state, and the retaining plate extends into the retention slot. Because the groove on the plug moves away from the lobe, and because the lobe can abut against the periphery of the plug when the retaining plate is pressed, the lever handle is prevented from being detached from the spindle tube against burglary when the door lock is in the locking position.

SUMMARY OF THE INVENTION

The object of the present invention is to provide a door lock assembly with a novel and simple support structure to support a tailpiece of a key-operated lock when the door lock assembly is in a locking state so that the tailpiece can sufficiently support a retaining plate to prevent a handle from being removed undesirably from the door lock assembly.

Accordingly, the present invention provides a door lock assembly which comprises: a handle having a tubular body provided with a radial retention slot; a spindle tube extending into the tubular body; a retaining plate disposed transversely inside the spindle tube, and having a retaining tongue projecting into the retention slot from the spindle tube, and a stabilizing part opposite to the retaining tongue; a spring biasing the retaining plate so that the retaining tongue projects into the retention slot; a support structure disposed within the tubular body oppositely of the retention slot, and having a support part extending radially into the spindle tube; and a lock unit mounted within the tubular body and having a key plug, and a tailpiece connected to the key plug and extending between the support part and the stabilizing part. The tailpiece has two diametrically opposite edges. When the lock unit is in a locking position and when the retaining tongue is pressed through the retention slot, one of the edges of the tailpiece abuts against the support part, and the other one of the edges abuts against the stabilizing part to prevent the retaining tongue from moving away from the retention slot.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
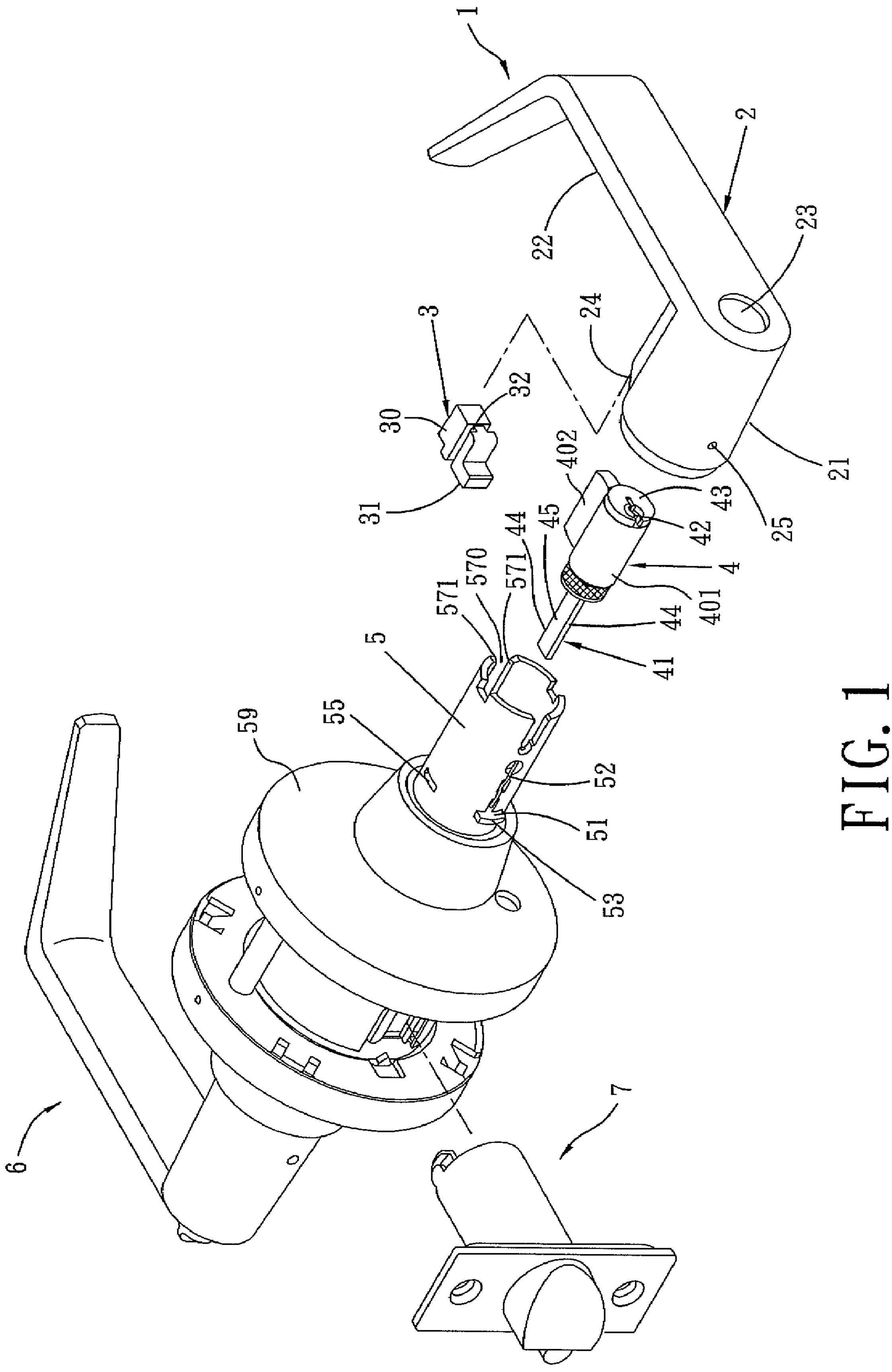
FIG. 1 is an exploded view of a door lock assembly embodying the present invention.

Before the present invention is described in greater detail, it should be noted that same reference numerals have been used to denote like elements throughout the specification.

Figure 2:
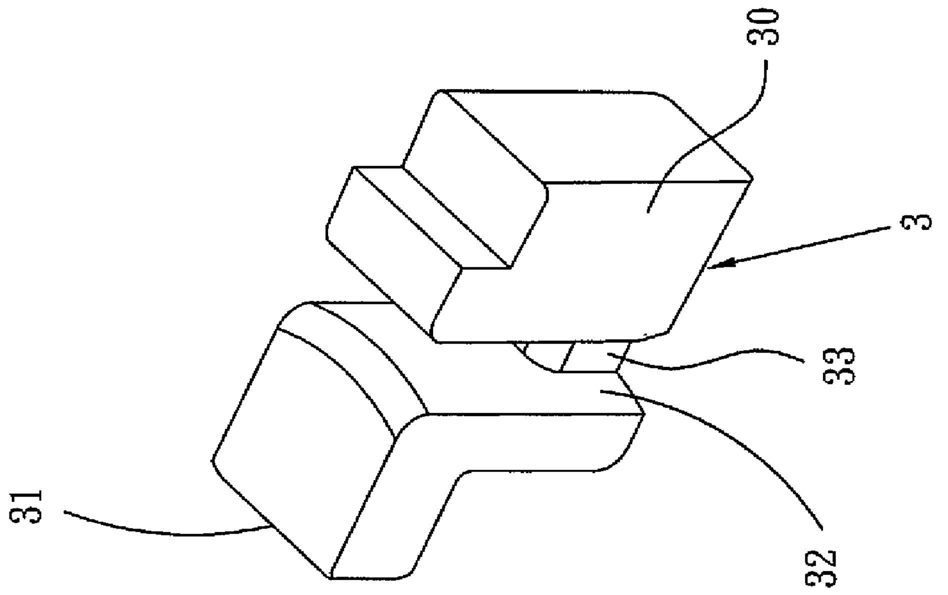
FIG. 2 is a perspective view of a support structure of the door lock assembly.

Referring to FIGS. 1 and 2, there is shown a door lock assembly including an outer handle device 1 embodying the present invention, a conventional inner handle device 6, and a conventional latching device 7 operated by the outer and inner handle devices 1 and 6. The outer handle device 1 generally includes a handle unit 2, a support structure 3, a lock unit 4, and a spindle tube 5.

The lock unit 4 is conventional, and includes a cylindrical case 401 receiving a key plug 43, a tumbler case 402 connected to the cylindrical case 401, and a tailpiece 41 connected integrally to the key plug 43. The tailpiece 41 has two diametrically opposite edges 44 interconnecting two opposite faces 45. The key plug 43 has a key slot 42 for insertion of a key (not shown). By operating the key plug 43 with the key, the tailpiece 41 is rotatable to a first position when the lock unit 4 is in a locking state, and a second position when the lock unit 4 is in an unlocking state.

Figure 3:
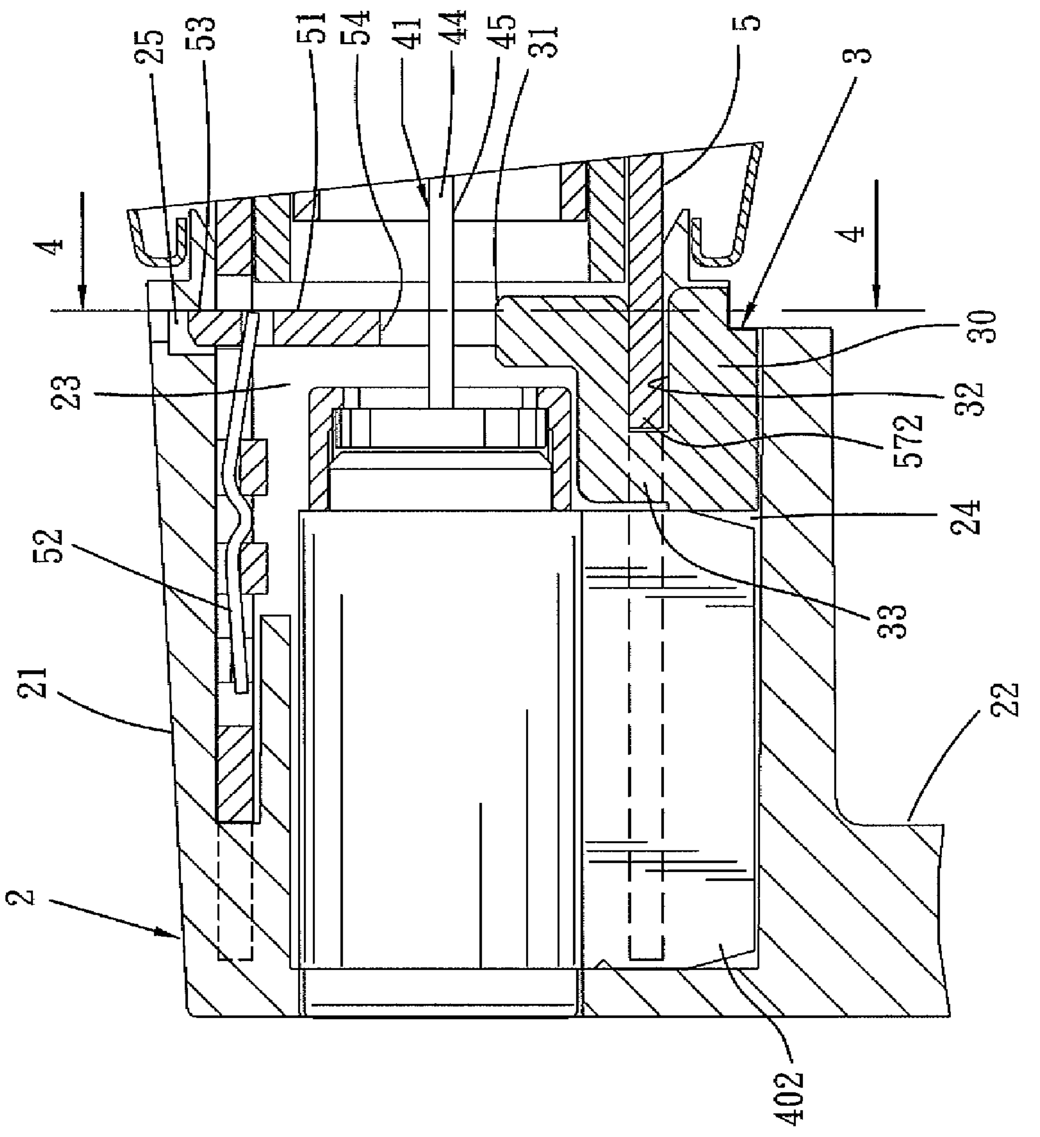
FIG. 3 is a sectional view taken along a longitudinal plane extending longitudinally through a handle device and a spindle tube of the door lock assembly.
Figure 4:
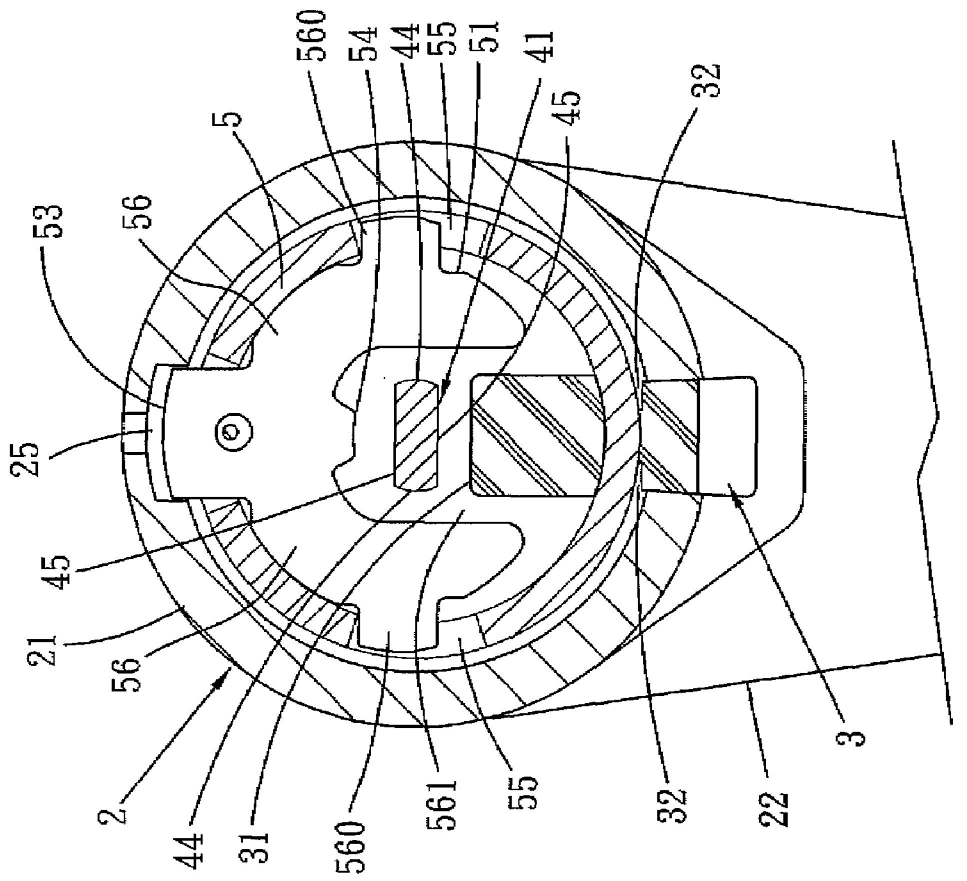
FIG. 4 is another sectional view taken along line 4-4 of FIG. 3.

Referring to FIGS. 3 and 4 in combination with FIG. 1, the handle unit 2 includes a tubular body 21, a handle 22 connected to the tubular body 21. The tubular body 21 has an axial hole composed of a cylindrical hole portion 23 receiving the cylindrical case 401, and a non-cylindrical hole portion 24 communicated with the cylindrical hole portion 23 and receiving the tumbler case 402. A retention slot 25 is formed radially in the tubular body 21 in communication with the cylindrical hole portion 23.

As is customary, the spindle tube 5 extends into the cylindrical hole portion 23 of the tubular body 21 and surrounds the tailpiece 41. A conventional outer rose assembly 59 is connected to the spindle tube 5. The spindle tube 5 further has a passage opening 570, and a bounding edge that bounds the passage opening 570 and that includes two opposite axial edge parts 571 and a circumferential edge part 572 (FIG. 3).

A retaining plate 51 is disposed transversely inside the spindle tube 5 and has a retaining tongue 53. A spring 52 is disposed inside the spindle tube 5 to bias the retaining plate 51 so that the retaining tongue 53 projects out of the spindle tube 5 and extends into the retention slot 25. The retaining plate 51 further has a stabilizing part 54 projecting inwardly in a direction towards said tail piece 41 and extending between two arms 56. The two arms 56 project oppositely from the retaining tongue 53, and extend on two sides of the tailpiece 41. A spacing 561 is thus formed between the arms 56. Two lugs 560 respectively project from the arms 56 in radial directions and into two slide slots 55 that are formed in the spindle tube 5 at two diametrically opposite positions. When the retaining plate 51 moves transversely inside the spindle tube 5, the lugs 560 are slideable in the respective slide slots 55.

The support structure 3 is disposed within the non-cylindrical hole portion 24 of the tubular body 21 and oppositely of the retention slot 25. The tumbler case 402 is adjacent to the support structure 3. The support structure 3 has a base part 30 disposed in the tubular body 21, a support part 31 extending into the spindle tube 5, a neck part 33 connected between the base part 30 and the support part 31 and passing through the passage opening 570 of the spindle tube 5, and an engagement groove 32 formed between the base part 30 and the support part 31 and adjacent the neck part 33. The support part 31 projects radially into the spacing 561 between the two arms 56 within the spindle tube 5. Further, the support part 31 is opposite to the stabilizing part 54 of the retaining plate 51 so that the tailpiece 41 is between the support part 31 and the stabilizing part 54.

The engagement groove 32 engages the axial edge parts 571 and the circumferential edge part 572 of the spindle tube 5 so that the support structure 3 is positioned firmly to the spindle tube 5. However, the present invention should not be limited thereto. The engagement groove 32 may be arranged to engage one or two of the axial edge parts 571 and the circumferential edge part 572.

Referring back to FIGS. 3 and 4, the tailpiece 41 is in the second position when the lock unit 4 is in the unlocking state, and the retaining tongue 53 of the retaining plate 51 extends into the retention slot 25 of the tubular body 21. In this state, the edges 44 of the tailpiece 41 are away from the stabilizing part 54 of the retaining plate 51 and the support part 31 of the support structure 3. Therefore, when a tool (not shown) or a narrow strip (not shown) is inserted into the retention slot 25 of the tubular body 25 to press the retaining tongue 53 against the spring 52, the retaining tongue 53 is moved inward and away from the retention slot 25 so that the handle unit 1 can be detached from the spindle tube 5 for replacement of the lock unit 4.

Figure 5:
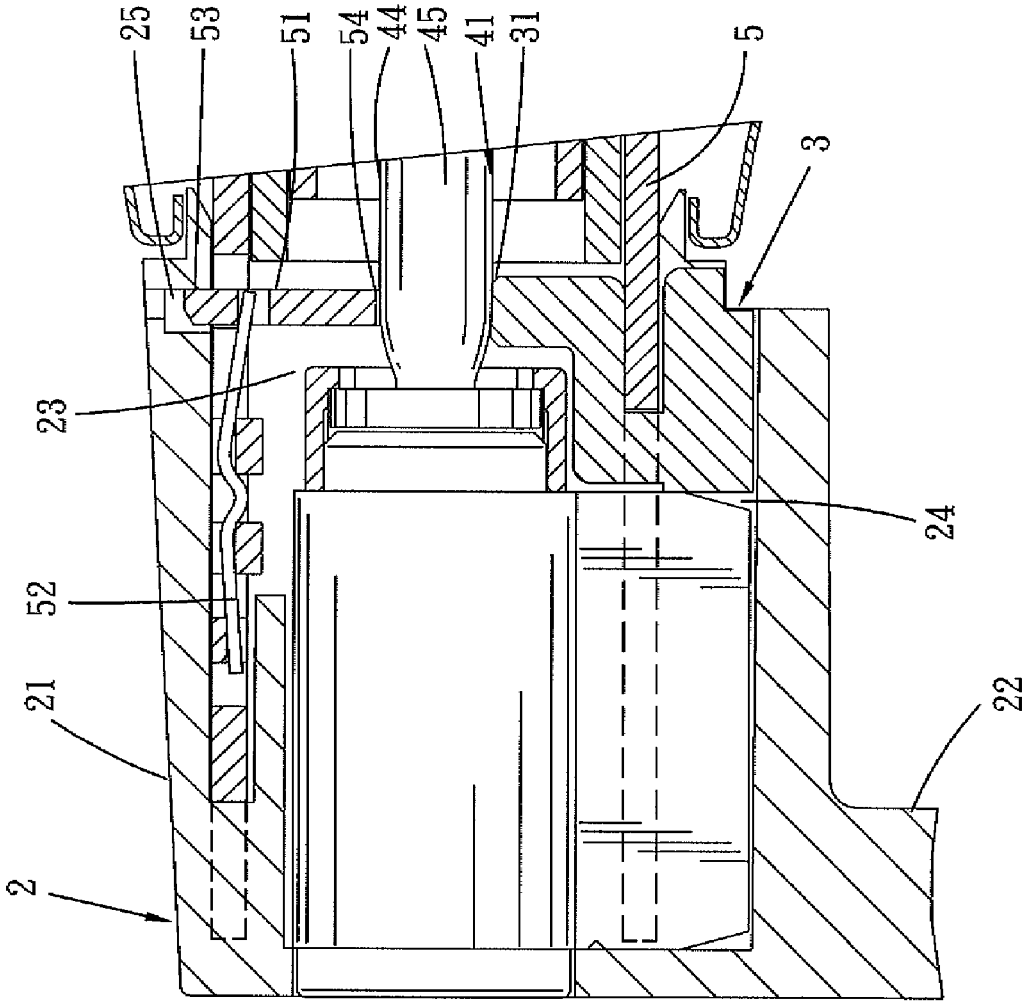
FIG. 5 is the same view as FIG. 3 but showing a tailpiece in a first position thereof.
Figure 6:
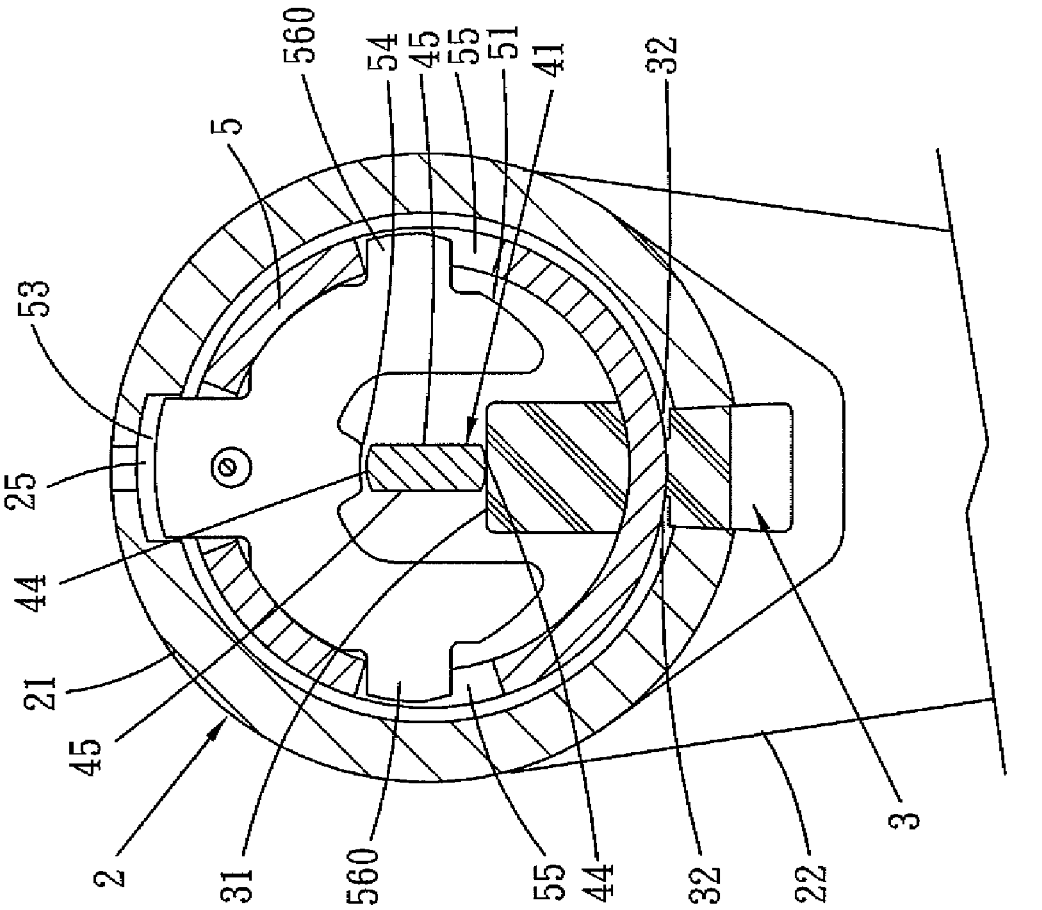
FIG. 6 is the same view as FIG. 4 but showing the tailpiece in the first position.
Figure 7:
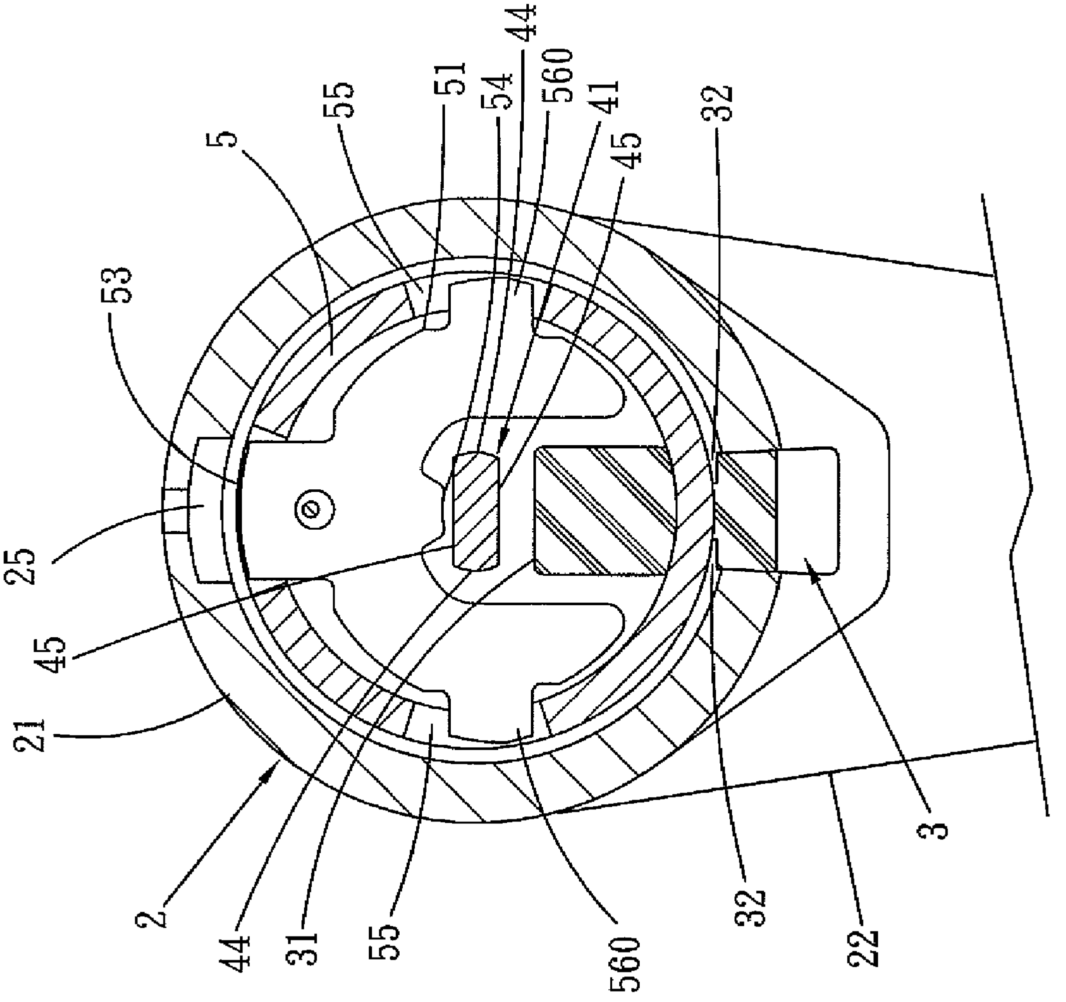
FIG. 7 is the same view as FIG. 3 but showing that a retaining plate is pressed inward.

Referring to FIGS. 5 and 6, the tailpiece 41 is in the first position when the lock unit 4 is the locking state, and the retaining tongue 53 extends into the retention slot 25. At this state, the edges 44 of the tailpiece 41 respectively move to the stabilizing part 54 of the retaining plate 51 and the support part 31 of the support structure 3. If the tool or the narrow strip (not shown) is inserted into the retention slot 25 to press the retaining tongue 53 of the retaining plate 51, the retaining tongue 53 cannot move out of the retention slot 25 because the support part 31 abuts against one of the edges 44 of the tailpiece 41 and the other edge 44 abuts against the stabilizing part 54 of the retaining plate 41. As a result, the handle unit 1 cannot be detached from the spindle tube 5, and the latching device 7 cannot be operated to unlock the door to which the latching device 7 is attached.

Figure 8:
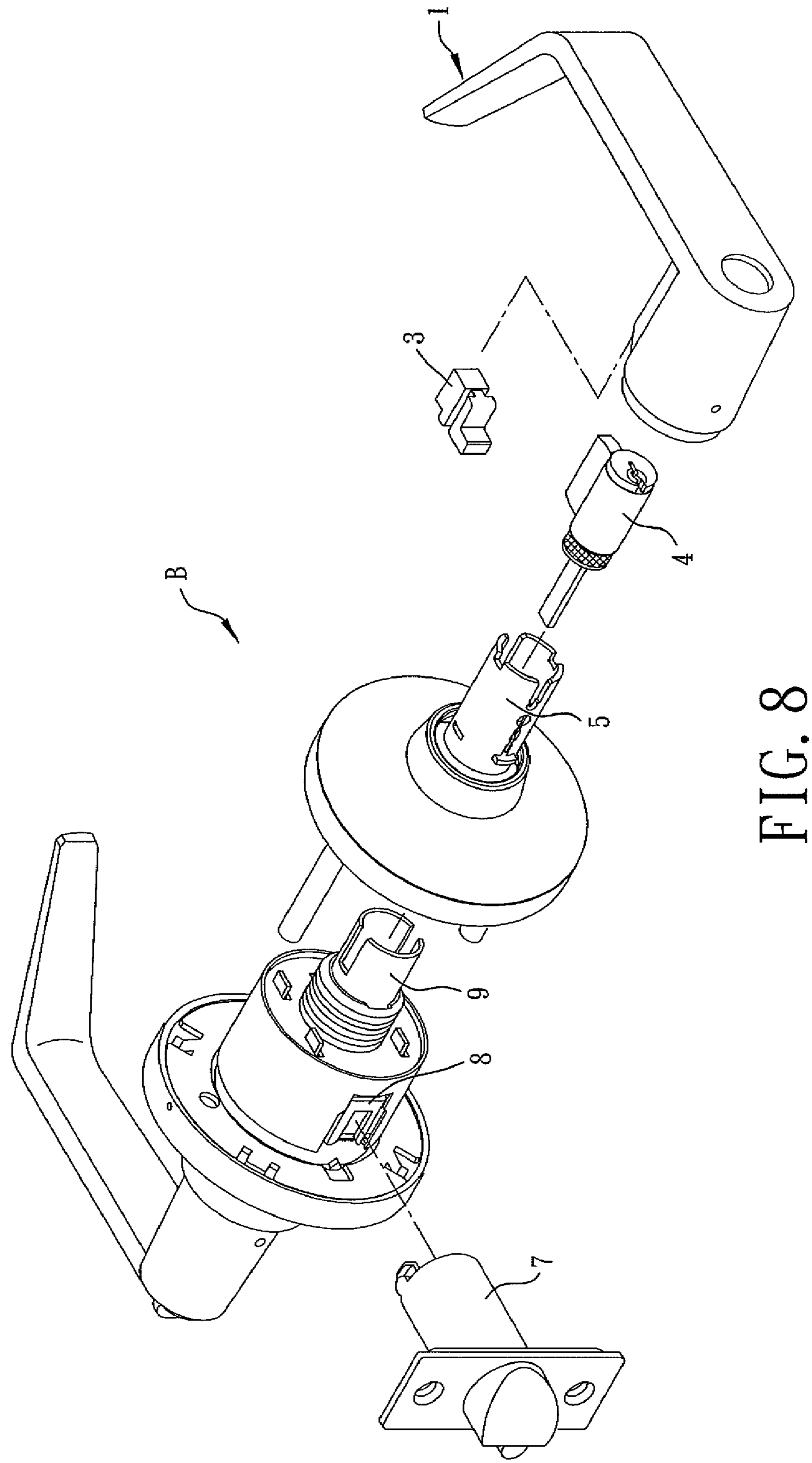
FIG. 8 shows another door lock assembly embodying the present invention.

Referring to FIG. 8, there is shown another door lock assembly (B) having an outer handle device 1 embodying the present invention. Compared to the door lock assembly shown in FIG. 1, the door lock assembly (B) is of a different type that includes a latch operator spindle 9 that is inserted into the spindle tube 5 and that has a tab (not shown) connected to a latch operator or retractor 8. The latch operator or retractor 8 is in turn connected to the latching device 7. Aside from the types of the door lock assemblies shown in FIGS. 1 and 8, the present invention may also be embodied in other types of door lock assemblies.

While the present invention has been described in connection with what is considered the most practical and preferred embodiment, it is understood that this invention is not limited to the disclosed embodiments but is intended to cover various arrangements included within the spirit and scope of the broadest interpretations and equivalent arrangements.

We claim:

1. A door lock assembly comprising:

a handle having a tubular body provided with a radial retention slot;

a spindle tube extending into said tubular body, and having a passage opening, and a bounding edge that bounds said passage opening;

a retaining plate disposed transversely inside said spindle tube, and having a retaining tongue projecting into said retention slot from said spindle tube, and a stabilizing part opposite to said retaining tongue;

a spring biasing said retaining plate so that said retaining tongue projects into said retention slot;

a support structure disposed within said tubular body oppositely of said retention slot, said support structure having a support part extending radially into said spindle tube, a base part disposed in said tubular body, a neck part connected between said base part and said support part and passing through said passage opening, and an engagement groove formed between said base part and said support part and adjacent said neck part, said engagement groove engaging said bounding edge; and a lock unit mounted within said tubular body, and having a key plug, and a tailpiece connected to said key plug and extending between said support part and said stabilizing part, said tailpiece having two diametrically opposite edges, wherein, when said lock unit is in a locking position and when said retaining tongue is pressed against said spring through said retention slot, one of said edges of said tailpiece abuts against said support part, and the other one of said edges abuts against said stabilizing part to prevent said retaining tongue from moving away from said retention slot.

2. The door lock assembly as claimed in claim 1, wherein said retaining plate further has two arms projecting from said retaining tongue and disposed respectively on two opposite sides of said tailpiece, said arms having a spacing therebetween, said support part extending radially into said spacing.

3. The door lock assembly as claimed in claim 2, wherein said stabilizing part projects inwardly in a direction towards said tail piece, and extends between said arms.

4. The door lock assembly as claimed in claim 1, wherein said bounding edge of said spindle tube includes two opposite axial edge parts, and a circumferential edge part, said passage opening being bounded by said axial edge parts and said circumferential edge part, said engagement groove engaging said axial edge parts and said circumferential edge part.

* * * * *